United States Patent
Zhang et al.

(10) Patent No.: US 10,732,191 B2
(45) Date of Patent: Aug. 4, 2020

(54) AUTOMATIC ANALYSIS DEVICE, ANALYSIS METHOD, AND ANALYSIS SYSTEM THEREFOR

(71) Applicant: Shenzhen Mindray Bio-Medical Electronics Co., Ltd., Shenzhen (CN)

(72) Inventors: Zhen Zhang, Shenzhen (CN); Peng Zhou, Shenzhen (CN); Jun Wang, Shenzhen (CN); Chuan-Fen Xie, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 18 days.

(21) Appl. No.: 16/292,766

(22) Filed: Mar. 5, 2019

(65) Prior Publication Data

US 2019/0195900 A1 Jun. 27, 2019

Related U.S. Application Data

(63) Continuation of application No. 14/884,792, filed on Oct. 16, 2015, now abandoned, which is a (Continued)

(30) Foreign Application Priority Data

Apr. 16, 2013 (CN) .......................... 2013 1 0132098

(51) Int. Cl.
*G01N 35/00* (2006.01)
*G01N 35/02* (2006.01)

(52) U.S. Cl.
CPC ... *G01N 35/0092* (2013.01); *G01N 35/00584* (2013.01); *G01N 35/02* (2013.01); *G01N 35/025* (2013.01); *G01N 2035/00356* (2013.01)

(58) Field of Classification Search
CPC ............ G01N 35/0092; G01N 35/025; G01N 35/00584; G01N 35/02; G01N 2035/00356
See application file for complete search history.

(56) References Cited

U.S. PATENT DOCUMENTS 4,837,159 A 6/1989 Yamada
5,985,672 A 11/1999 Kegelman
(Continued)

FOREIGN PATENT DOCUMENTS

CN 1963527 A 5/2007
CN 101266255 A 9/2008
(Continued)

*Primary Examiner* — Melanie Brown
*Assistant Examiner* — Richard Moerschell
(74) *Attorney, Agent, or Firm* — Kory D. Christensen

(57) ABSTRACT

An automatic analysis device, an analysis method, and an analysis system are provided. The automatic analysis device comprises an incubation unit. When analyzing a sample under test, the incubation unit is controlled to rotate according to a predetermined transport cycle, wherein each transport cycle comprises at least one fixed transport sub-period in which the incubation unit is rotated a first rotation distance, and at least one self-adaptive transport sub-period in which the incubation unit is rotated a second rotation distance; when the incubation unit is controlled to rotate in the fixed transport sub-period of each transport cycle, in the stop period of the fixed transport sub-period, at least one regular operation capable of being performed in the fixed transport sub-period is performed; and when the incubation unit is controlled to rotate in the self-adaptive transport sub-period of each transport cycle, the incubation unit is controlled to rotate and stop at an executing station capable of performing a self-adaptive operation, and the self-adaptive operation is performed. The present invention can balance the test flux and analysis performance.

18 Claims, 9 Drawing Sheets

Related U.S. Application Data continuation of application No. PCT/CN2013/083960, filed on Sep. 23, 2013.

(56) References Cited

U.S. PATENT DOCUMENTS

| | | |
|---|---|---|
| 2005/0220671 A1 | 10/2005 | Stein et al. |
| 2007/0189925 A1 | 8/2007 | Blecka |
| 2009/0017491 A1 | 1/2009 | Lemme et al. |
| 2009/0308183 A1 | 12/2009 | Cohen |
| 2012/0156764 A1 | 6/2012 | Kondo |

FOREIGN PATENT DOCUMENTS

| | | |
|---|---|---|
| CN | 101452004 A | 6/2009 |
| WO | WO 2007013960 A1 | 2/2007 |
| WO | WO 2006060214 A1 | 6/2008 |

AUTOMATIC ANALYSIS DEVICE, ANALYSIS METHOD, AND ANALYSIS SYSTEM THEREFOR

CROSS-REFERENCE TO RELATED APPLICATIONS

This application is a continuation under 35 U.S.C. § 120 of U.S. patent application Ser. No. 14/884,792, filed on Oct. 16, 2015, which is a continuation under 35 U.S.C. 365 of International Application No. PCT/CN2013/083960, filed on Sep. 23, 2013, which claims priority and benefit under 35 U.S.C. § 119 of Chinese Patent Application No. 201310132098.1, filed on Apr. 16, 2013. The content of each of the above-mentioned applications is hereby incorporated by reference in their entireties.

FIELD

The present application relates to an automatic analysis device, and particularly to an automatic analysis device which can make a target to be analyzed illuminate.

BACKGROUND

An immunity analyzer is usually used to detect a number of target components in blood, urine, or the other body fluid in clinical laboratories. The immunity analyzer needs to support a number of immunity reaction modes, such as a competition method, a sandwich method, an indirect method, a capture method, etc. The immunity analysis usually includes a radioimmunoassay (RIA), an euzymelinked immunosorbent assay (ELISA), and a luminescence immunoassay (LIA). The luminescence immunoassay has become a major technology used in a clinical immunoassay analyses due to advantages of environmental protecting, a high detecting sensitivity, and a wide detecting range. The luminescence immunoassay is a new label-type immunoassay technology for detecting a trace antigen or antibody by combing a luminescence analysis with an immunoreaction, which combines the high sensitivity of chemiluminescence and the high specificity of immunoreaction. Take one-step sandwich method as an example, the main principle of the luminescence immunoassay is described as below: in order to test a target component in a sample, antibodies/antigens corresponding to the target component can be coated on a number of magnetic beads to form a magnetic bead reagent, and the antibodies can be labeled by a specified marker to form a labeling reagent. Generally, several kinds of reagents are needed in one analysis item, such as the magnetic bead reagent, the labeling reagent mentioned here, etc. The different kinds of reagents of a same analysis item can be received in a number of different reagent containers or in a number of different cavities of a same reagent container. During a test process, the sample containing the target component is first mixed successively with the magnetic bead reagent, the labeling reagent, and other reagents to form a reaction solution of the sample and the reagents, which is incubated under certain conditions to form a reaction complex. Then, unbound markers, reagents, and components of the sample in the reaction system are removed by using bound-free (B/F) separation technology. Afterwards, a signal reagent is added into the reaction solution, with which the marker of the reaction complex reacts (or catalyzes the signal reagent) and then illuminates. There can be one or more kinds of signal reagents, such as luminescent substrate solutions, trigger solutions, pre-trigger solutions, enhanced luminescence substrate solutions, etc. Also, there are numerous methods to realize the bound-free separation technology. In addition to the above-mentioned magnetic bead method, other methods of coating antibodies on a wall of a reaction container or on plastic beads can also be used.

Considering that immunoreaction modes for different target components have different features, a luminescence immunity analyzer usually employs the following conventional test modes:

(1) One-Step Test Mode

FIG. 1 illustrates a one-step and one-separation test mode, which is the simplest test mode, in which a reagent is added only once during the test process. A sample and a reagent are added into a reaction container and mixed together to form a reaction solution. Thereafter, the reaction container containing the mixed reaction solution is placed under a thermostatic condition to perform an incubation reaction for a certain period of time. After the incubation reaction, a bound-free separation is performed on the reaction solution. A signal reagent is added to the reaction solution after the bound-free separation, and then the reaction container containing the signal reagent is placed under a thermostatic condition to perform an incubation reaction for a certain period of time, after which an optical detection of the reaction container is performed. FIG. 2 illustrates another test mode, in which the optical detection of the reaction container is performed without incubation after the signal reagent is added. An example includes a chemiluminescence test mode, which is based on electrochemical luminescence or flash system.

(2) Two-Step and One-Separation Test Mode

Referring to FIG. 3, a sample and a reagent (named a first reagent, which may include several kinds of compositions) are added into a reaction container and mixed together to form a reaction solution. Thereafter, the reaction container containing the mixed reaction solution is placed under a thermostatic condition to perform an incubation reaction for a certain period of time (named a first incubation). Then, a reagent (named a second reagent, which may include several kinds of compositions) is added into the reaction container and mixed with the reaction solution. Thereafter, the reaction container containing the mixed reaction solution is placed under a thermostatic condition to perform an incubation reaction for a certain period of time (named a second incubation). After the second incubation, a bound-free separation is performed to the reaction solution. A signal reagent is added to the reaction solution after the bound-free separation, and then the reaction container containing the signal reagent is placed under a thermostatic condition to perform an incubation reaction for a certain period of time, after which an optical detection is performed. As mentioned above, in some tests, the optical detection is performed directly without incubation after the signal reagent is added.

(3) Two-Step and Two-Separation Test Mode

Referring to FIG. 4, a sample and a reagent (named a first reagent, which may include several kinds of compositions) are added into a reaction container and mixed together to form a reaction solution. Thereafter, the reaction container containing the mixed reaction solution is placed under a thermostatic condition to perform an incubation reaction for a certain period of time (named a first incubation). After the first incubation, a bound-free separation is performed to the reaction solution. Then, a reagent (named a second reagent, which may include several kinds of compositions) is added into the reaction container and mixed with the reaction solution. Thereafter, the reaction container containing the mixed reaction solution is placed under a thermostatic condition to perform an incubation reaction for a certain period of time (named a second incubation). After the second incubation, a bound-free separation is performed to the reaction solution. A signal reagent is added to the reaction solution after the bound-free separation, and then the reaction container containing the signal reagent is placed under a thermostatic condition to perform an incubation reaction for a certain period of time, after which an optical detection is performed. As mentioned above, in some tests, the optical detection is performed directly without incubation after the signal reagent is added.

In addition to the conventional test steps mentioned above, there are also some special test steps, such as a sample pre-treatment step, a sample pre-dilution step, and three-step test mode, etc.

The existing luminescence immunity analyzers can be classified as single-mode analyzers and multi-modes analyzers according to the flexibility of the incubation time duration and test steps. In a single-mode luminescence immunity analyzer, reaction containers are transported to different executing stations via a "fixed" rotation of an incubation unit. The fixed rotation means that a rotation distance or a step increment of the incubation unit in each periodic time period (cycle) is invariable and does not change with the incubation time duration, such that the incubation unit drives reaction containers thereon to move regularly. Thus, these kinds of immunity analyzers only support a fixed combination of several test steps and several kinds of invariable incubation time durations, for example, only the one-step and one-separation test mode or two-step and two-separation test mode can be realized, the incubation time duration of which can be several fixed time periods or an integral multiple of a fixed time period, such as 15 minutes, 30 minutes, or 45 minutes etc. In this regard, the incubation unit can transport the reaction containers thereon in a fixed step increment several times to realize the incubation time duration and after the incubation to reach an executing station capable of performing a specific operation by designing a transport logic. The multi-mode luminescence immunity analyzers can support flexible combinations of several test steps and variable incubation time durations. Namely, the conventional test steps and the special test steps mentioned above can be combined flexibly, and the incubation time duration can be set flexibly, from several seconds to a few minutes, such as 15 seconds, 6 minutes, 10.5 minutes, 60 minutes, etc. The single-mode luminescence immunity analyzer is lack of flexibility, and the analysis mode of the single-mode luminescence immunity analyzer is limited. The incubation time duration of the single-mode luminescence immunity analyzer cannot be adjusted according to the requirements of different test items, which degrades the analysis performance or the test flux of some test items. The multi-mode luminescence immunity analyzers can choose optimized test steps and incubation time duration according to the features of test items, which makes the analysis performance ideal.

In practice, the incubation time duration depends on the test items. It is ideal to make the incubation time duration adjustable according to the type of test items. In the multi-mode luminescence immunity analyzer, reaction containers are transported to different executing stations via a "self-adaptive" rotation of the incubation unit. The self-adaptive rotation means that the rotation distance of the incubation unit in each periodic time period can be adjusted according to the test steps and the incubation time duration of each test item, namely, the rotation distance of a self-adaptive rotation of the incubation unit, can be varied with the requirements of the test steps and the incubation time duration. The executing stations include, but are not limited to, a sample injecting station, a reagent injecting station, a move-in station of moving a reaction container in, a move-out station of moving a reaction container out, and a detecting station. At least one operation mechanism for performing a specific operation on a reaction container is arranged around every executing station, such as injecting apparatuses for injecting a sample and injecting a reagent (e.g. a sample needle and a reagent needle), a delivering mechanism for delivering a reaction container (e.g. a gripper), a detection device for detecting a signal of the analyte in a reaction container (e.g. a photometer), etc. In a multi-sample analysis, each time after the incubation unit transports a target reaction container to a target executing station via a self-adaptive rotation. Only a specific operation can be performed on the target reaction container in the target executing station. Since the other reaction containers may not be located at other executing stations, in which the operations required by the other reaction containers can be performed, the other reaction containers may not be treated in the other executing stations simultaneously with the target reaction container. Therefore, the incubation unit needs to rotate many times, so that a series of operations such as moving a reaction container in, injecting a sample, injecting a reagent, and moving a reaction container out, can be performed successively. For a multi-sample analysis, the inefficiency of this serial fashion test mode adversely limits the test flux of the luminescence immunity analyzer.

SUMMARY

The present application provides an automatic analysis device, an analysis method, and an analysis system thereof, which can concurrently perform a number of analysis operations and can satisfy different incubation time duration requirements, and also can balance the test flux and the analysis performance.

A first aspect of this application is an automatic analysis method of an automatic analysis device, the method being used to control rotation of an incubation unit and control analysis operations related to the incubation unit, the analysis operations comprising a plurality of regular operations and a plurality of self-adaptive operations, wherein the analysis method comprises:

Controlling the rotation of the incubation unit according to a predetermined transport cycle, each transport cycle comprises at least one fixed transport sub-period in which the incubation unit is rotated for a first rotation distance and at least one self-adaptive transport sub-period in which the incubation unit is rotated for a second rotation distance, the first rotation distance of each fixed transport sub-period is determined at least by a reference position and a predetermined rotation interval, the reference position is defined as an initial position of the incubation unit when the automatic analysis device starts analysis for the first transport cycle; for the $n^{th}$ transport cycle, the reference position is defined as a stop position where the incubation unit stops after rotating for the fixed transport sub-period of the previous transport cycle, wherein n is an integer greater than or equal to two, the second rotation distance of each self-adaptive transport sub-period is determined by a present position of a reaction container requiring a self-adaptive operation and a position of an executing station for performing this self-adaptive operation.

Performing at least one of the regular operations to be performed in the fixed transport sub-period, in a stop duration of the fixed transport sub-period, when the incubation unit is controlled to rotate in the fixed transport sub-period of the transport cycle.

Controlling the incubation unit to rotate and stop at an executing station capable of performing a self-adaptive operation and controlling an operation mechanism corresponding to the executing station to perform the self-adaptive operation, when the incubation unit is controlled to rotate in the self-adaptive transport sub-period of the transport cycle.

Another analysis method of an automatic analysis device is provided, the automatic analysis device comprising an incubation unit, the method being used to control rotation of the incubation unit and control analysis operations related to the incubation unit, the analysis operations comprising a plurality of regular operations and a plurality of self-adaptive operations, wherein the analysis method comprises:

Controlling the rotation of the incubation unit according to a predetermined transport cycle, each transport cycle comprises at least one fixed transport sub-period in which the incubation unit is rotated for a first rotation distance and at least one self-adaptive transport sub-period in which the incubation unit is rotated for a second rotation distance, the first rotation distance of each fixed transport sub-period is a constant step increment, the second rotation distance of each self-adaptive transport sub-period is determined by a present position of a reaction container requiring a self-adaptive operation and a position of an executing station for performing this self-adaptive operation;

Performing at least one of the regular operations to be performed in the fixed transport sub-period, in a stop duration of the fixed transport sub-period, when the incubation unit is controlled to rotate in the fixed transport sub-period of the transport cycle;

Controlling the incubation unit to rotate and stop at an executing station capable of performing a self-adaptive operation, controlling an operation mechanism corresponding to the executing station to perform the self-adaptive operation, when the incubation unit is controlled to rotate in the self-adaptive transport sub-period of the transport cycle. And controlling the incubation unit to rotate and stop at a position where the incubation unit stops in the fixed transport sub-period of the present transport cycle, after the self-adaptive operation is performed.

A second aspect of the present disclosure is an analysis system of an automatic analysis device, the automatic analysis device comprising an incubation unit, the analysis system being used to control rotation of the incubation unit and control analysis operations related to the incubation unit, the analysis operations comprising a plurality of regular operations and a plurality of self-adaptive operations, wherein the analysis system comprises:

A transport control unit configured to control the incubation unit to rotate in accordance with a predetermined transport cycle, wherein each transport cycle comprises at least one fixed transport sub-period in which the incubation unit is controlled to rotate a first rotation distance and then stop, and at least one self-adaptive transport sub-period in which the incubation unit is controlled to rotate a second rotation distance and then stop, the first rotation distance of each fixed transport sub-period is determined at least by a reference position and a predetermined rotation interval, the reference position is defined as an initial position of the incubation unit when the analysis device starts analysis for the first transport cycle; for the $n^{th}$ transport cycle, the reference position is defined as a stop position where the incubation unit stops after rotating for the fixed transport sub-period of the previous transport cycle, wherein n is an integer greater than or equal to two, the second rotation distance of each self-adaptive transport sub-period is determined by a present position of a reaction container requiring a self-adaptive operation and a position of an executing station for performing this self-adaptive operation;

A regular operation control unit configured to control an operation mechanism to perform at least one of the regular operations to be performed in the fixed transport sub-period, in a stop duration of the fixed transport sub-period of the transport cycle;

A self-adaptive operation control unit configured to control an operation mechanism to perform at least one of the self-adaptive operations, in a stop duration of the self-adaptive transport sub-period of the transport cycle.

Another analysis system of an automatic analysis device is provided, the automatic analysis device comprising an incubation unit, the analysis system being used to control rotation of the incubation unit and control analysis operations related to the incubation unit, the analysis operations comprising a plurality of regular operations and a plurality of self-adaptive operations, wherein the analysis system comprises:

A transport control unit configured to control the incubation unit to rotate in accordance with a predetermined transport cycle, wherein each transport cycle comprises at least one fixed transport sub-period in which the incubation unit is controlled to rotate a first rotation and then stop, and at least one self-adaptive transport sub-period in which the incubation unit is controlled to rotate for a second rotation distance and then stop, the first rotation distance of each fixed transport sub-period is a constant step increment, the second rotation distance of each self-adaptive transport sub-period is determined by a present position of a reaction container requiring a self-adaptive operation and a position of an executing station for performing this self-adaptive operation;

A regular operation control unit configured to control an operation mechanism to perform at least one of the regular operations to be performed in the fixed transport sub-period, in a stop duration of the fixed transport sub-period of the transport cycle;

A self-adaptive operation control unit configured to control an operation mechanism to perform at least one of the self-adaptive operations, in a stop duration of the self-adaptive transport sub-period of the transport cycle. And the transport control unit controls the incubation unit to rotate and stop at a stop position of incubation in a previous fixed transport sub-period of the present transport cycle, after the self-adaptive operation is performed.

A third aspect of the present disclosure is an automatic analysis device comprising:

An incubation unit configured to provide a place to incubate a reaction solution, wherein the incubation unit is a rotatable ring structure and comprises at least one reaction container holder for holding a reaction container, and at least one executing station for providing a performing region for a reaction container is defined on a rotation track of the incubation unit;

At least one operation mechanism set around the incubation unit, wherein an executing station corresponding to the operation mechanism is located at an intersection of a reaction container holder and a movement track of the operation mechanism or an intersection of the container holder and a center line of the operation mechanism;

An analysis system used to control rotation of the incubation unit in accordance with a predetermined transport cycle and control analysis operations related to the incubation unit, the analysis operations comprising a plurality of regular operations and a plurality of self-adaptive operations, each transport cycle comprises at least one fixed transport sub-period in which the incubation unit is rotated for a first rotation distance and at least one self-adaptive transport sub-period in which the incubation unit is rotated for a second rotation distance, the first rotation distance of each fixed transport sub-period is determined at least by a reference position and a predetermined rotation interval, the reference position is defined as an initial position of the incubation unit when the analysis device starts analysis for the first transport cycle; for the $n^{th}$ transport cycle the reference position is defined as a stop position where the incubation unit stops after rotating for the fixed transport sub-period of the previous transport cycle, wherein n is an integer greater than or equal to two, the second rotation distance of each self-adaptive transport sub-period is determined by a present position of a reaction container requiring a self-adaptive operation and a position of an executing station for performing this self-adaptive operation. The analysis system controls the operation mechanism to perform at least one of the regular operations to be performed in the fixed transport sub-period, in a stop duration of the fixed transport sub-period of the transport cycle, when the incubation unit is controlled to rotate in the fixed transport sub-period of the transport cycle, and controls the incubation unit to rotate and stop at an executing station capable of performing the self-adaptive operation, controls an operation mechanism corresponding to the executing station to execute the self-adaptive operation, when the incubation unit is controlled to rotate in the self-adaptive transport sub-period of the transport cycle.

BRIEF DESCRIPTION OF THE DRAWINGS

The present disclosure is illustrated by way of embodiments and accompanying drawings.

DETAILED DESCRIPTION

Figure 1:
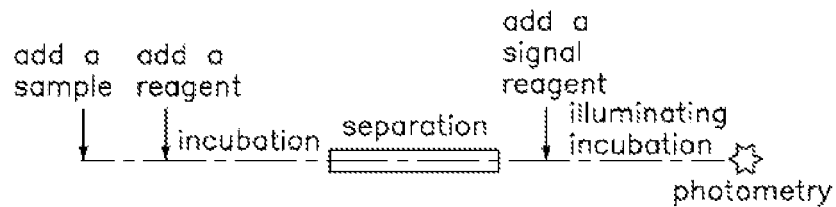
FIG. 1 is a schematic flowchart of one-step and one-separation test mode of a luminescence immunity analysis.

At least one executing station is defined on a rotation track of the incubation unit, to provide an operation position for a reaction container. In order to indicate the relative position of each executing station, a position coordinate system is defined. The position coordinates (hereafter coordinates for short) of the position coordinate system correspond to the container holders on the incubation unit one by one when the incubation unit remains stationary. Several operation mechanisms are set around the incubation unit. When the incubation unit rotates to transport reaction containers to executing stations corresponding to the operation mechanisms, the operation mechanisms are capable of being controlled to perform corresponding operations on the reaction containers. When the incubation unit is rotated according a predetermined rotation interval, if the predetermined rotation interval M is less than a total number N of the reaction container holders on the incubation unit and cannot be exactly divided by N, each reaction container holder can pass through all of the coordinates (namely, can pass through all of the executing stations) when the incubation unit is rotated the predetermined rotation interval M for N times. In an embodiment of this disclosure, the operations of the automatic analysis device on the incubation unit are classified as a number of regular operations and a number of self-adaptive operations. A regular operation is defined as an operation that can be performed during a process in which the incubation unit transports the reaction containers to pass through all the coordinates, for example, a move-in operation of moving a reaction container into the incubation unit, a metering operation, etc. However, due to special requirements, some operations cannot be performed during the process in which the reaction containers pass through all the coordinates, and these operations are called self-adaptive operations. The self-adaptive operations, for example, can be the operations performed immediately after a flexible incubation time duration of a sample to be tested. The rotation distance of the incubation unit before a self-adaptive operation is variable at least based on the flexible incubation time duration. Concretely in an immunoassay analysis, it is usually desired that the incubation time duration of a reaction solution is variable, that is, the incubation time duration is set according to a specific test type and the rotation distance is not necessarily an integral multiple of the fixed step increment. The operations to be performed after the incubation are called the self-adaptive operations, for example, a move-out operation to be performed after incubation of moving a reaction container out of the incubation unit and a second reagent injecting operation of adding a second reagent. Some special operations to be performed according to some situations can also be self-adaptive operations, for example, a second reagent injecting operation or a move-out operation of moving a reaction container to be agitated out of the incubation unit, and so on.

A transport cycle is also defined in the present disclosure. Each transport cycle includes at least one fixed transport sub-period in which the incubation unit is rotated for a first rotation distance, and at least one self-adaptive sub-period in which the incubation unit is rotated for a second rotation distance. Each transport sub-period includes a transport duration and a stop duration. The number of the fixed transport sub-periods and the self-adaptive transport sub-periods can be flexibly set according to the configuration and the test mode of the automatic analysis device. For example, the transport cycle can include one fixed transport sub-period and one self-adaptive transport sub-period, or can also include one fixed transport sub-period and two self-adaptive transport sub-periods, or can include two fixed transport sub-periods and two self-adaptive transport sub-periods. The incubation unit is rotated according to the fixed transport sub-period and the self-adaptive transport sub-period of the transport cycle, so as to transport the reaction containers to specific executing stations. Regular operations required by different tests are performed in the fixed transport sub-period, and only a specific self-adaptive operation of a specific test is performed in the self-adaptive transport sub-period.

The present disclosure is further illustrated as below be way of embodiments and accompanying drawings.

First Embodiment

Figure 5:
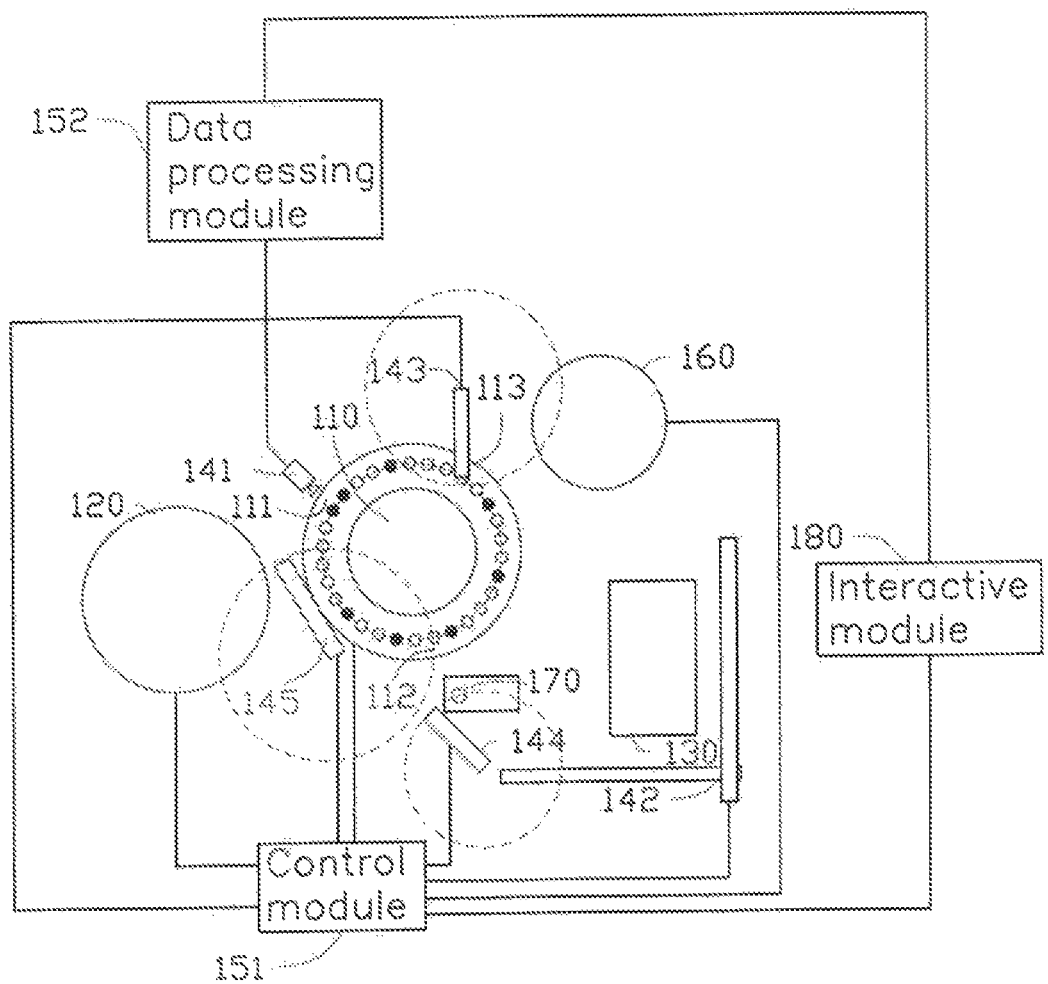
FIG. 5 is a schematic diagram of an embodiment of an automatic analysis device.

Referring to FIG. 5, an automatic analysis device 100 includes an incubation unit 110, a reagent holder 120, a reaction container supply 130, at least one operation mechanism, and an analysis system. The incubation unit 110 provides a place to incubate a reaction solution. The incubation unit 110 is a rotatable ring-shaped structure and includes at least one circular ring. At least one container holder is provided on the incubation unit 110 to hold at least one reaction container. At least one executing station for providing a performing region for a reaction container is defined on a rotation track of the incubation unit 110. In some embodiments, in view of a temperature requirement of the incubation of the reaction solution, the incubation unit 110 also provides a constant temperature environment. The reagent holder 120 is used to hold a number of reagent containers, such as a reagent bottle, and supplies different reagents for tests. The reaction container supply 130 is used to receive a number of reaction containers, such as a cuvette, and supplies the reaction containers for tests. In a specific embodiment, the reagent holder 120 and the reaction container supply 130 are respectively located at a peripheral region of the incubation unit 110. In some embodiments, the automatic analysis device 100 further includes a cleaning separator 160 and a sample supply depot 170 set at the peripheral region of the incubation unit 110. The cleaning separator 160 is used to remove unbound components in the reaction system. In FIG. 5, the cleaning separator 160 is located outside the incubation unit 110, that is, the cleaning separator and the incubation unit are arranged separately. The sample supply depot 170 is used to provide a place to inject a sample. In some embodiments, the sample supply depot 170 can also be arranged on the incubation unit 110.

The operation mechanisms include a detection unit 141, a delivering unit, a sample injecting unit 144, and a reagent injecting unit 145. The delivering unit is used to deliver a reaction container between the incubation unit 110 and the other units located at the periphery of the incubation unit, for example the other units can be such as the cleaning separator 160, the sample supply depot 170, and the reaction container supply 130. The detection unit 141 is used to detect a target component contained in a reaction container on the incubation unit. The detection unit can be a photometer which measures concentration of the target component by detecting luminous intensity and outputs an electric signal related to the luminous intensity. The injecting unit includes the sample injecting unit 144 and the reagent injecting unit 145. The sample injecting unit can be a sample needle configured to draw and inject a sample. The reagent injecting unit can be a reagent needle configured to draw and inject a reagent. The sample injecting unit and the reagent injecting unit can also be integrated in an injecting unit. In the present embodiment, the delivering unit includes a first delivering unit 142 and a second delivering unit 143. The first delivering unit 142 is used to deliver a reaction container among the incubation unit 110, the sample supply depot 170, and the reaction container supply 130. A delivering track of the second delivering unit 143 intersects with the incubation unit 110 and the cleaning separator 160 respectively, and the second delivering unit is used to deliver a reaction container between the incubation unit 110 and the cleaning separator 160.

Corresponding to the operation mechanisms, the executing stations around the incubation unit 110 include a detection station 111 where the detection unit 141 detects a target component in a reaction container, an injecting station 112 where the reagent injecting unit injects a reagent, a delivering station 112, 113 where the delivering unit delivers a reaction container, etc. It will be understood by those skilled in the art that one of the executing stations mentioned above can correspond to more than one operation mechanism, for example, the executing station 112 can be both the injecting station corresponding to the injecting operation of the reagent injecting unit and the delivering station corresponding to the delivering operation of the first delivering unit.

The analysis system includes a control module 151 and a data processing module 152. The control module 151 is connected to the incubation unit 110, the reagent holder 120, the cleaning separator 160, the sample injecting unit 144, the reagent injecting unit 145, the first delivering unit 142, and the second delivering unit 143 to control the action of each unit. On the other hand, the control module 151 is connected to an interactive module 153, so as to receive input information of a user by the interactive module. The data processing module 152 is connected to the detection unit 141, so as to receive an electric signal output from the detection unit 141, process the electric signal, and further output the process result to the user via the interactive module 180. In some embodiments, the control module 151 is further connected to the detection unit 141, so as to control the analysis operation of the detection unit 141.

In an embodiment of the present disclosure, the control module 151 of the analysis system controls rotation of the incubation unit 110 according to a predetermined transport cycle and controls analysis operations related to the incubation unit 110. The analysis operations include regular operations and self-adaptive operations. Each transport cycle includes at least one fixed transport sub-period and at least one self-adaptive transport sub-period corresponding to the self-adaptive operations of the test item. The control module 151 controls the incubation unit 110 to rotate a first rotation distance in the fixed transport sub-period of the transport cycle, then controls the incubation unit 110 to stop in the stop duration of the fixed transport sub-period, and then controls the operation mechanisms to perform the regular operations that can be performed in the stop duration of the fixed transport sub-period. In this embodiment, the first rotation distance of the fixed transport sub-period is determined at least according to a reference position and a rotation interval. For the first transport cycle after the automatic analysis device starts to analyze, the reference position is defined as an initial position of the incubation unit where the automatic analysis device starts. For the $n^{th}$ transport cycle, the reference position is defined as a stop position where the incubation unit 110 stops after rotating for the fixed transport sub-period of the $(n-1)^{th}$ transport cycle, wherein n is an integer greater than or equal to two. The control module 151 controls the incubation unit 110 to rotate a second rotation distance in the self-adaptive transport sub-period of the transport cycle and to stop at the executing station capable of performing a specific self-adaptive operation, and then controls the operation mechanism to perform the specific self-adaptive operation at this executing station. The second rotation distance of the self-adaptive transport sub-period is determined by a present position of the reaction container requiring a specific self-adaptive operation and the position of the executing station for performing the specific self-adaptive operation.

In a specific embodiment, the regular operations to be performed in a fixed transport sub-period and the self-adaptive operations to be performed in a self-adaptive transport sub-period are determined by an operation time sheet of the operations of the sample to be tested. The user inputs a plurality of samples to be tested and test items corresponding to the samples via the interactive module before starting analysis. Which test mode is to be employed, one-step test mode or the two-steps test mode, can be determined by the test items. The analysis system generates an operation time sheet of the operations of the samples to be tested according to the samples to be tested and the test items input by the user. The operation time sheet can be generated after the test items are input and before the analysis is started, or can also be generated during the analysis. If the performing times of some regular operations required by some samples to be tested match a fixed transport sub-period of a transport cycle, the analysis system controls operation mechanisms to perform the regular operations during the fixed transport sub-period. Thus, the test flux is improved by this way. For a preset self-adaptive transport sub-period of a transport cycle, if the performing time of a self-adaptive operation required by a sample to be tested matches the self-adaptive transport sub-period of the transport cycle, the analysis system controls an operation mechanism to perform the self-adaptive operation during the self-adaptive transport sub-period. When determining whether the performing time of a self-adaptive operation matches a self-adaptive transport sub-period, because each transport cycle includes at least one self-adaptive transport designed for the self-adaptive operations related to the test items, all the self-adaptive operations can be traversed when the incubation unit rotates according to the transport cycle, so that the analysis system checks whether or not there is a sample to be tested that has been incubated in the self-adaptive transport sub-period and needs a self-adaptive operation corresponding to the self-adaptive transport sub-period. Thus, in this embodiment, the self-adaptive operations are considered as the sequential operations, and every self-adaptive operation can be considered and performed at the specific time required by the self-adaptive operation. Variable incubation time durations can be supported and the requirements of test items on the analysis performance are met, so that the analysis performance of the analyzer is improved.

Figure 6:
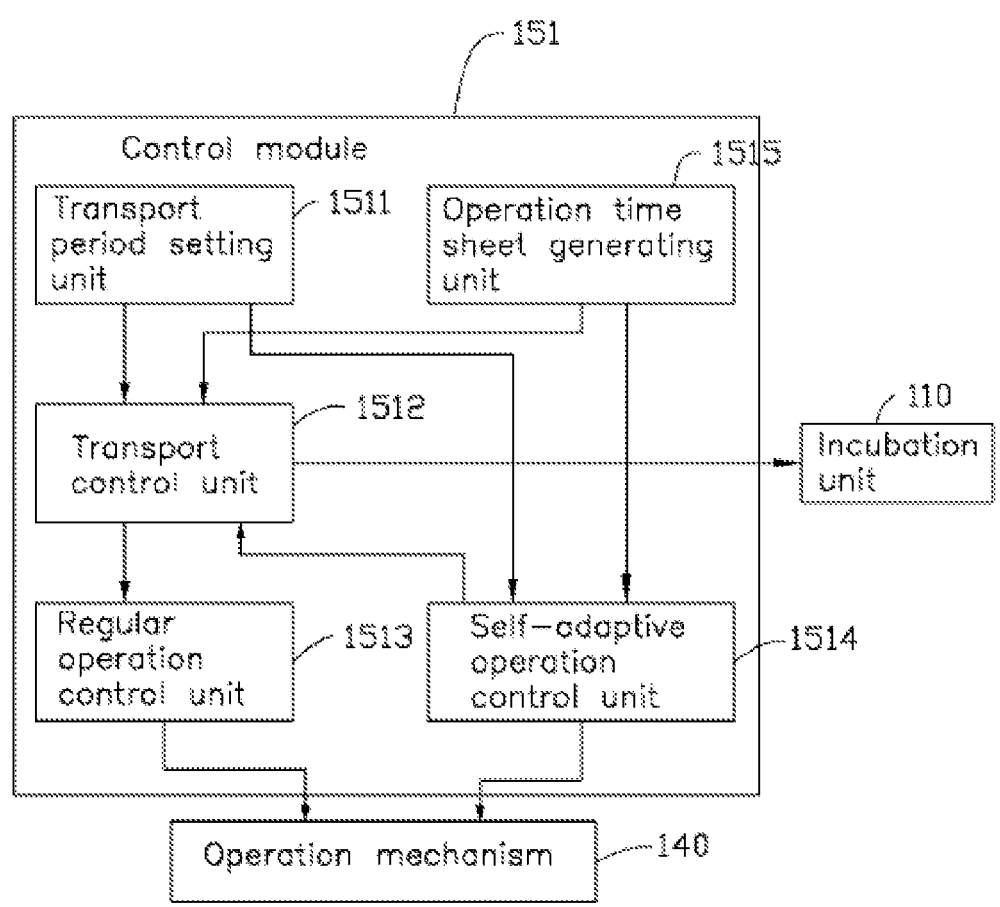
FIG. 6 is a block diagram of an embodiment of an analysis system of the automatic analysis device of FIG. 5.

Referring to FIG. 6, in a specific embodiment, the control module 151 of the analysis system includes a transport cycle saving unit 1511, a transport control unit 1512, a regular operation control unit 1513, and a self-adaptive operation control unit 1514. The transport cycle saving unit 1511 is used to save a predetermined transport cycle. Each transport cycle includes at least one fixed transport sub-period and at least one self-adaptive transport sub-period corresponding to the self-adaptive operations of this test item. The transport control unit 1512 is used to control the incubation unit 110 to rotate according to the transport cycles output from the transport cycle saving unit 1511. In the fixed transport sub-period of the transport cycle, the incubation unit is controlled to rotate a first rotation distance and stop. In the self-adaptive transport sub-period of the transport cycle, the incubation unit is controlled to rotate a second rotation distance and stop at an executing station capable of performing a corresponding self-adaptive operation. The regular operation control unit 1513 is used to control operation mechanisms to perform corresponding regular operations, which can be performed in the fixed transport sub-period, in a stop duration of the fixed transport sub-period of the transport cycle. The self-adaptive operation control unit 1514 is used to control an operation mechanism to perform a corresponding self-adaptive operation in a stop duration of the self-adaptive transport sub-period of the transport cycle.

In another specific embodiment, the control module 151 further includes an operation time sheet generating unit 1515. The operation time sheet generating unit 1515 is used to generate an operation time sheet of the operations of the samples to be tested, according to the samples to be tested and the test items input by a user. The regular operation control unit 1513 determines the regular operations to be performed, the performing times of which match the fixed transport sub-period of the transport cycle, according to the operations time sheet, and controls the operation mechanisms to perform the regular operations matching the fixed transport sub-period after the transport control unit controls the incubation unit to rotate and then stop according to the fixed transport sub-period of the transport cycle. The self-adaptive operation control unit 1514 determines the self-adaptive operation to be performed, the performing time of which matches the self-adaptive transport sub-period of the transport cycle and which corresponds to the sample to be detected in the self-adaptive transport sub-period. The self-adaptive operation control unit calculates the rotation distance of the incubation unit according to the present position of the reaction container to be operated with the self-adaptive operation and the position of the executing station for performing the self-adaptive operation, when the transport control unit controls the incubation unit to rotate in the self-adaptive transport sub-period. The transport control unit controls the incubation unit to rotate for the rotation distance. The self-adaptive operation control unit controls the operation mechanism to perform the self-adaptive operation after the incubation unit stops. When the self-adaptive operation control unit determines that there is no self-adaptive operation to be performed in the self-adaptive transport sub-period, the transport control unit controls the incubation unit to remain stationary in the self-adaptive transport sub-period.

The first rotation distance of the fixed transport sub-period can be calculated when the fixed transport sub-period is going to start, or can also be calculated after the operation time sheet is generated. There is one reference position and one target position defined after each fixed transport sub-period. The target position is defined as a position where the incubation unit stops after rotating for the predetermined rotation interval from the reference position. For the first transport cycle after the automatic analysis device starts to perform tests, the reference position is defined as an initial position where the automatic analysis device starts to perform tests. For the $n^{th}$ transport cycle, the reference position is defined as a stop position where the incubation unit stops after rotating for the fixed transport sub-period of the $(n-1)^{th}$ transport cycle, wherein n is an integer greater than or equal to two.

Similarly, the second rotation distance of the self-adaptive transport sub-period can be calculated when the self-adaptive transport is going to start, or can also be calculated after the operation time sheet is generated. After the operation time sheet is generated, it can be determined that, in which self-adaptive transport sub-period of which transport cycle should which self-adaptive operation be performed, according to the operation time sheet. The second rotation distance can be determined by a position of a reaction container requiring a self-adaptive operation before the incubation unit rotates according to the self-adaptive transport sub-period and a target position. The target position is defined as the position of the executing station for performing the self-adaptive operation.

In order to better understand the technological merit of present application, the present disclosure is further illustrated as below be way of combing specific transport cycles.

Figure 8:
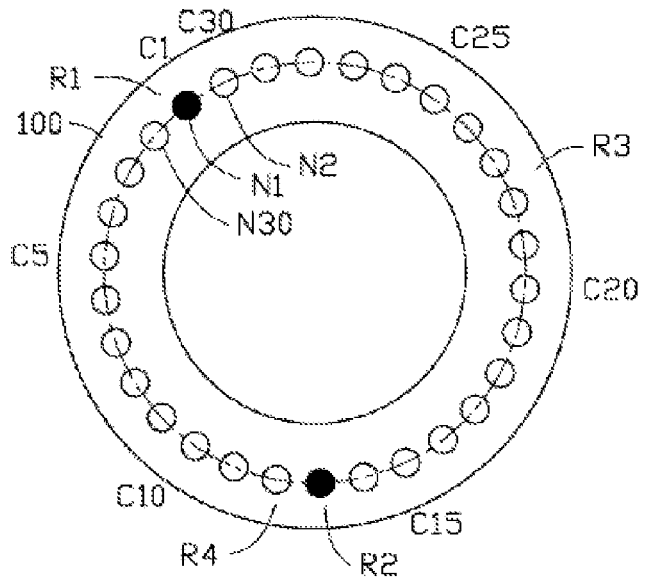
FIG. 8 is a diagrammatic view of an embodiment of an incubation unit.

Referring to FIG. 8, in one specific embodiment, the incubation unit 110 is ring-shaped and includes at least one ring-shaped carousel. In this embodiment, the incubation unit 110 is a single carousel. A number of grooves or apertures are provided on the incubation unit 110, which are called reaction container holders. A total number of the reaction container holders on the incubation unit 110 is labeled as N, which equals thirty in this embodiment. The reaction container holders are used to incubate and/or hold the reaction containers and transport the reaction containers to the specific executing stations for performing the corresponding operations. The executing stations R are a number of specific positions on the rotation track of the incubation unit where the reaction containers on the incubation unit can reach. The specific positions are the positions where the reaction containers are operated by the operation mechanisms, such as an intersection of a reaction container holder and a movement track of a operation mechanism or an intersection of a container holder and a center line of a operation mechanism. For example, the injecting station is located at the intersection of a reaction container holder and a movement track of the injecting unit, and the detection station is located at the intersection of a reaction container holder and a center line of the detection unit. The operations performed by the operation mechanisms can be classified as regular operations and self-adaptive operations. The regular operations are performed in the stop duration after the incubation unit is rotated a fixed rotation distance, and the regular operations are usually necessary for each test but are unrelated to the incubation time duration, such as a move-in operation of moving a reaction container into the incubation unit, a photometry operation, and so on. The self-adaptive operations are performed in the stop duration after the incubation unit is rotated a self-adaptive rotation distance and are relevant to the test steps and the incubation time duration, such as a second reagent injecting operation, a move-out operation, and so on. In this embodiment, the regular photometry operation is performed at the executing station R1, the regular move-in operation is performed at the executing station R2, the self-adaptive operation of injecting reagent and the self-adaptive operation of moving-out after incubation are performed at the executing station R3, and the regular operation of moving a reaction container out is performed at the executing station R4.

For convenience of description, the following is provided: in order to mark a relative position relationship of each executing station, a position coordinate system is defined. The position coordinate of an executing station for performing a regular operation is numbered as C1, and the position coordinates of the other executing stations are numbered as C2 . . . C30 along a counterclockwise direction beginning with C1, such that the position coordinates of the executing stations R4, R2, and R3 are C11, C12, and C23 respectively. In order to mark a relative position relationship of each reaction container holder, the reaction container holders are numbered, namely, the position coordinate of the reaction container holder, in which position the incubation unit stays in a reset state or a original state of being located at C1, is numbered as N1, and the other reaction container holders are numbered as N2, N3 . . . N30 along a clockwise direction beginning with N1.

Figure 2:
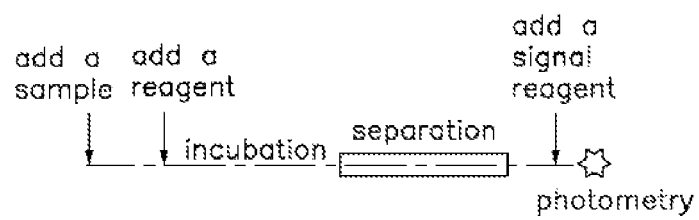
FIG. 2 is another schematic flowchart of one-step and one-separation test mode of a luminescence immunity analysis.

For the one-step test mode, a reagent is injected only once during a test, as illustrated in FIG. 1 or 2. The operations of the test include a sample injecting operation, a reagent injecting operation, a move-in operation of moving a new reaction container to be tested into the incubation unit, a move-out operation of moving a incubated reaction container out of the incubation unit and delivering the incubated reaction container to the cleaning separator, a move-in operation of moving a reaction container cleaned by the cleaning separator back to the incubation unit, and a photometry operation. Among these operations, the duration of incubation after sample injection and reagent injection is a self-adaptive duration set according to the requirement of the test item, thus, the move-out operation after incubation is a self-adaptive operation, and the other operations are regular operations.

Figure 9:
FIG. 9 is a sequence chart of an embodiment of a transport cycle of the incubation unit of FIG. 8 in accordance with one-step test mode.

In one embodiment, a transport cycle includes at least one fixed transport sub-period and one self-adaptive transport sub-period. The $n^{th}$ transport cycle is illustrated in FIG. 9, in which one transport cycle includes one fixed transport sub-period and one self-adaptive transport cycle, meaning that the incubation unit rotates twice and stops twice in one transport cycle. One fixed transport sub-period illustrated in FIG. 9 includes one SC duration and one ST duration. The incubation unit rotates a fixed distance in the SC duration and stops in the ST duration after rotating for the fixed distance. One self-adaptive transport sub-period includes one AC duration and one AT duration. The incubation unit rotates a self-adaptive distance in the AC duration and stops in the AT duration after rotating for the self-adaptive distance. The self-adaptive operation to be performed in the AT duration is a self-adaptive move-out operation after the incubation of the reaction solution (hereafter move-out operation after incubation for short).

Figure 7:
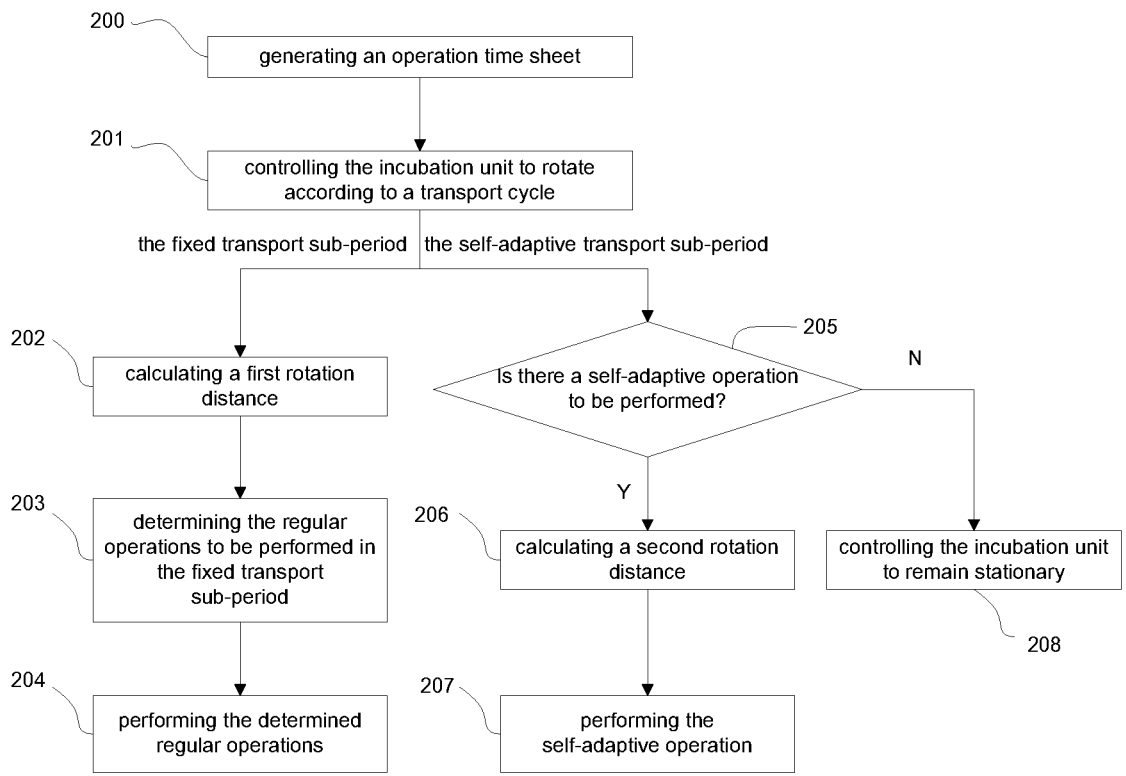
FIG. 7 is a flowchart of an embodiment of a component analysis method of the automatic analysis device of FIG. 5.

A flowchart in accordance with an embodiment of a component analysis method based on the automatic analysis device and the analysis system mentioned above is illustrated in FIG. 7. The method includes the steps as below:

Step 200, generating an operation time sheet according to samples to be tested and test items input by a user. For example, the operation time sheet can be a two-dimensional data sheet. An operation time is determined by a sample to be tested and an operation thereof. The operation time is determined based on the start time of the analysis device, the test serial number and the test items of the samples to be tested, and the transport cycles.

Step 201, starting to analyze, in which the incubation unit is positioned at an initial position and then controlled to rotate according to a predetermined transport cycle. The transport cycle includes at least one fixed transport sub-period in which the incubation unit rotates a first rotation distance, and at least one self-adaptive transport sub-period in which the incubation unit rotates a second rotation distance.

The operations to be performed in the stop duration of each transport sub-period are determined according to the sequence of each transport sub-period when the incubation unit is controlled to rotate according to the transport cycle. The steps below are executed respectively according to whether the present transport sub-period is the fixed transport sub-period or the self-adaptive transport sub-period.

In Step 202, when the incubation unit is ready to rotate in the forthcoming fixed transport sub-period, the analysis system will first calculate the first rotation distance of this fixed transport sub-period. The rotation distance is usually given in a unit of a reaction container holder. In the analysis system, one corresponding predetermined rotation distance for each fixed transport sub-period of each transport cycle is set in advance. There is only one predetermined rotation distance if one transport cycle includes only one fixed transport sub-period. A same rotation distance or different rotation distances can be set if one transport cycle includes more than two fixed transport sub-periods. The incubation unit stops at the initial position when the analysis is started. In the first transport cycle, the first rotation distance of all fixed transport sub-periods is a distance difference defined between a present position of the reaction container corresponding to the present transport cycle and the target position along a rotation direction of the incubation unit, and the target position is defined as a position where the incubation unit stops after rotating for the predetermined rotation distance from the initial position. For the transport cycles after the first transport cycle, a reference position is defined as a stop position where the incubation unit stops after rotating for the fixed transport sub-period of the previous transport cycle, and the target position is defined as a position where the incubation unit stops after rotating for the predetermined rotation distance from the reference position. For example, the first rotation distance is equal to a distance difference defined between a present position of the reaction container corresponding to the present transport cycle and the target position along a rotation direction of the incubation unit.

In Step 203, the analysis system further determines the specific regular operation to be performed in the forthcoming stop duration of the fixed transport sub-period, before the incubation unit stops to rotate. For the fixed transport sub-period, the operation time sheet is checked to find whether the performing time of each regular operation for each sample to be tested matches with the fixed transport sub-period or not. If the performing time of a regular operation matches with the fixed transport sub-period, then step 204 is executed.

In Step 204, the incubation unit is controlled to rotate for the calculated first rotation distance, and the regular operation matching with the fixed transport sub-period is performed in the stop duration of the fixed transport sub-period.

In Step 205, when the incubation unit is ready to rotate in the forthcoming self-adaptive transport sub-period, the analysis system will first determine the self-adaptive operation to be performed in the forthcoming self-adaptive transport sub-period. For the self-adaptive transport sub-period, the operation time sheet is checked to find whether the performing time of the self-adaptive operation for each sample to be tested matches with the self-adaptive transport sub-period. If there is a self-adaptive operation matching with the self-adaptive transport sub-period, then step 206 is executed. If there is no self-adaptive operation matching with the self-adaptive transport sub-period, then step 208 is executed.

In Step 206, the analysis system calculates the second rotation distance of the present self-adaptive transport sub-period. The second rotation distance is calculated as a distance difference between a present position of the reaction container to be operated with the self-adaptive operation and a position of the executing station for performing the self-adaptive operation along the rotation direction of the incubation unit.

In Step 207, the incubation unit is controlled to rotate for the calculated second rotation distance, and the self-adaptive operation is performed on the sample to be tested in the stop duration of the present self-adaptive transport sub-period.

In Step 208, if there is no self-adaptive operation matching with the forthcoming self-adaptive transport sub-period, it is preferable that the incubation unit remains stationary in the forthcoming self-adaptive transport sub-period. In other embodiments, the incubation unit can also rotate a predetermined distance in a unit of a reaction container holder.

In the steps mentioned above, steps 202, 203, 205, and 206 can be executed during or before the rotation of the incubation unit according to the transport cycle, as long as the operation time sheet and the transport cycle have been determined.

For example, For the Tn transport cycle, when the incubation unit is controlled to rotate in the forthcoming fixed transport sub-period, the operation time sheet is checked to determine the performing time of the regular operation for the reaction containers moved into the incubation unit, which matches with the fixed transport sub-period, e.g. the photometry time of the reaction container held in the reaction container holder N1 is found to match with the ST duration. After the incubation unit rotates for the SC duration, the positions of the reaction containers on the incubation unit are illustrated in FIG. 8, and the reaction container holders N1 and N19 are located at the executing stations R1 and R2 respectively. In the ST duration, the operation mechanisms perform corresponding regular operations at the executing stations R1 and R2 respectively. If the reaction container holder N19 is now empty, the first delivering unit can be controlled to perform a move-in operation of moving a new reaction container into the reaction container holder N19. At the same time, the reagent injecting unit is controlled to perform a reagent injecting operation, namely, the reagent injecting unit is controlled to perform a regular operation of injecting a reagent into the reaction container held in the reaction container holder N19 after the reaction container is moved into the reaction container holder N19. In the ST duration, the detection unit 141 can also be concurrently controlled to perform a photometry operation on the reaction container N1 located at the detection executing station R1. Thus, in the ST duration of the fixed transport sub-period, at least the first delivering unit 142 and the reagent injecting unit 142 concurrently perform a regular operation after the incubation unit is rotated a fixed amount. Even three or four regular operations can be concurrently performed, such as a photometry operation on the reaction container in the reaction container holder N1 performed by the detection unit at executing station R1, a move-in operation of moving a new reaction container into the reaction container holder N19 performed by the delivering unit at executing station R2, and so on. Therefore, a plurality of regular operations can be concurrently performed at a time, so that the analysis efficiency of the operation mechanisms is increased by the concurrent performing of operations in the fixed transport sub-period and the test flux of the automatic analysis device is increased.

The incubation unit starts to rotate in the AC duration of the self-adaptive transport sub-period after the regular operations have been performed in the ST duration. The self-adaptive operation to be performed in the stop duration AT of the self-adaptive transport sub-period is a move-out operation after incubation. When the incubation unit is about to rotate in the AT duration of the self-adaptive transport sub-period, the operation time sheet is checked to find whether there is a reaction container on the incubation unit requiring a move-out operation after incubation, which matches with the stop duration AT. If there is a move-out operation matching with the stop duration AT, a X reaction container holders' distance (the second rotation distance) which the incubation unit needs to rotate is calculated according to the present position of the reaction container requiring the move-out operation after incubation and the position of the executing station for performing the move-out operation after incubation. In this embodiment, with a counterclockwise direction as a positive direction, X is an integer less than the total number N of the container holders on the incubation unit. The analysis system controls the incubation unit to rotate for the X reaction container holders' distance when the incubation unit rotates in the AC duration of the self-adaptive transport sub-period, and stops the incubation unit at the executing station for performing the move-out operation after incubation. If X is equal to zero, then the incubation unit remains stationary or rotates for a N reaction container holders' distance. In the stop duration AT of the self-adaptive transport sub-period, the corresponding operation mechanism is controlled to perform the move-out operation after incubation on the matching reaction container and move the reaction container to the cleaning separator 160.

In general, the operations to be performed after the fixed transport sub-period of each transport cycle include a move-in operation of moving a new reaction container into the incubation unit. That means a new test is activated in each transport cycle. In the first transport cycle, the only operation to be performed in the fixed transport sub-period is a move-in operation of moving a new reaction container into the empty container holder located at the executing station R2. A first test is then added in the test process on the incubation unit after the move-in operation of moving the new reaction container. After several transport cycles, many tests are added in the test process on the incubation unit. However, it should be noted that, in the Tn transport cycle, the reaction container moved into the incubation unit during the ST duration is not the reaction container moved out of the incubation unit during the AT duration, but another reaction container which has been already moved into the incubation unit before the Tn transport cycle.

Figure 10:
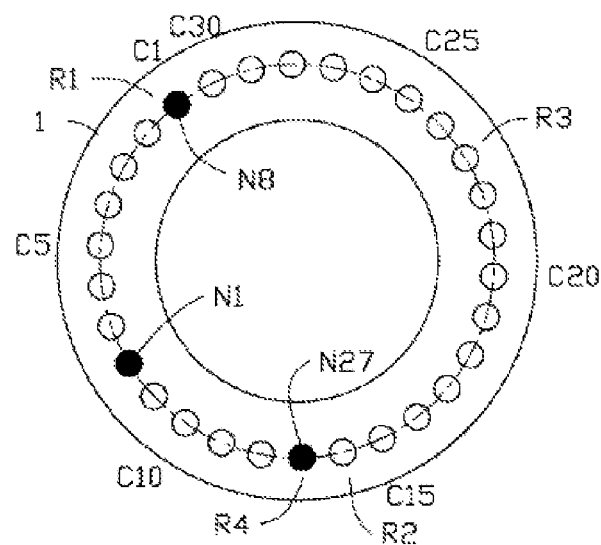
FIG. 10 is a schematic diagram illustrating a location relationship of a number of reaction containers on the incubation unit after a fixed rotation.
Figure 11:
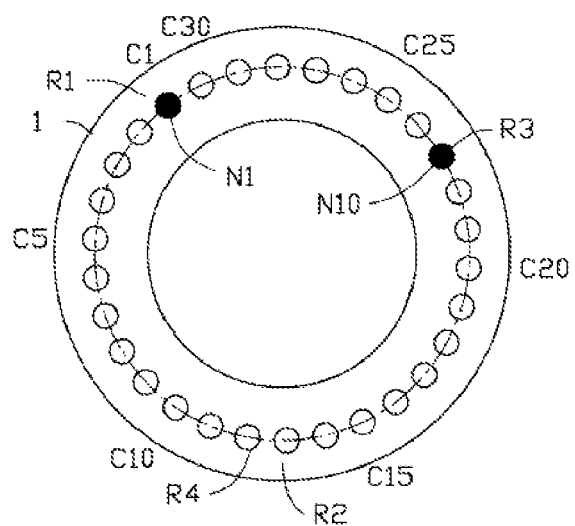
FIG. 11 is a schematic diagram illustrating a location relationship of a number of reaction containers on the incubation unit after a self-adaptive rotation.

In the T(n+1) transport cycle, the positions of the reaction containers on the incubation unit are illustrated in FIG. 10, after the incubation unit rotates in the SC duration of the fixed transport sub-period. With the counterclockwise direction as the positive direction, the distance or step increment (the first rotation distance) which the incubation unit rotates along in a counterclockwise direction is calculated as (M−X) (wherein (M−X) is greater than zero, the distance or step increment is a distance or a step increment along the clockwise direction when (M−X) is less than zero, and (M−X) equal to zero means that the incubation unit remains stationary). The X is the step increment of the self-adaptive transport sub-period of the previous Tn transport cycle. After the T(n+1) fixed transport sub-period, comparing with the previous Tn fixed transport sub-period, the incubation unit rotates counterclockwise a M container holders' distance (the predetermined rotation distance), where the constant M is less than N and cannot be exactly divided by N. In this embodiment, M equals seven. The container holders N8 and N27 are now located at the executing stations R1 and R4 respectively, and the corresponding regular operations can be concurrently performed on the reaction containers held in the container holders N8 and N27 respectively. If the incubation of the reaction container held in the container holder N10 is finished and a self-adaptive move-out operation after incubation is required to perform, the second rotation distance is calculated according to the present position of the reaction container holder N10 and the position of the executing station R3 for performing the self-adaptive move-out operation after incubation. As shown in FIG. 10, the incubation unit rotates counterclockwise a twenty four container holders' distance in the self-adaptive transport sub-period. As shown in FIG. 11, the reaction container holder N10 is transported to the executing station R3 for performing the self-adaptive move-out operation after incubation.

In each cycle of subsequent tests, the incubation unit rotates according to the fixed transport sub-period and the self-adaptive transport sub-period of each transport cycle, so as to transport the reaction containers to the executing stations for perform corresponding regular operations and corresponding self-adaptive operations. Thus, a variable incubation time duration and a flexible combination of different testing processes are realized. The fixed transport sub-period can ensure that each reaction container traverses all the coordinates of executing stations after N transport cycles, that is, each reaction container traverses all of the executing stations and is operated with the corresponding regular operation when arriving at the corresponding executing station. The incubation unit transports the reaction container requiring a self-adaptive operation to the specific executing station in the self-adaptive transport sub-period AC. The incubation unit rotates in the counterclockwise direction a X container holders' distance, wherein X is zero, one, two, . . . , N, and relevant to the total number N of the reaction container holders, the testing process of reaction and the incubation time duration. The value of X is determined by a position of a reaction container requiring a self-adaptive operation and a position of an executing station for performing the self-adaptive operation. Thus, in the self-adaptive transport sub-period of any transport period or cycle, any reaction container can be transported to the executing station for performing the required operation.

Figure 12:
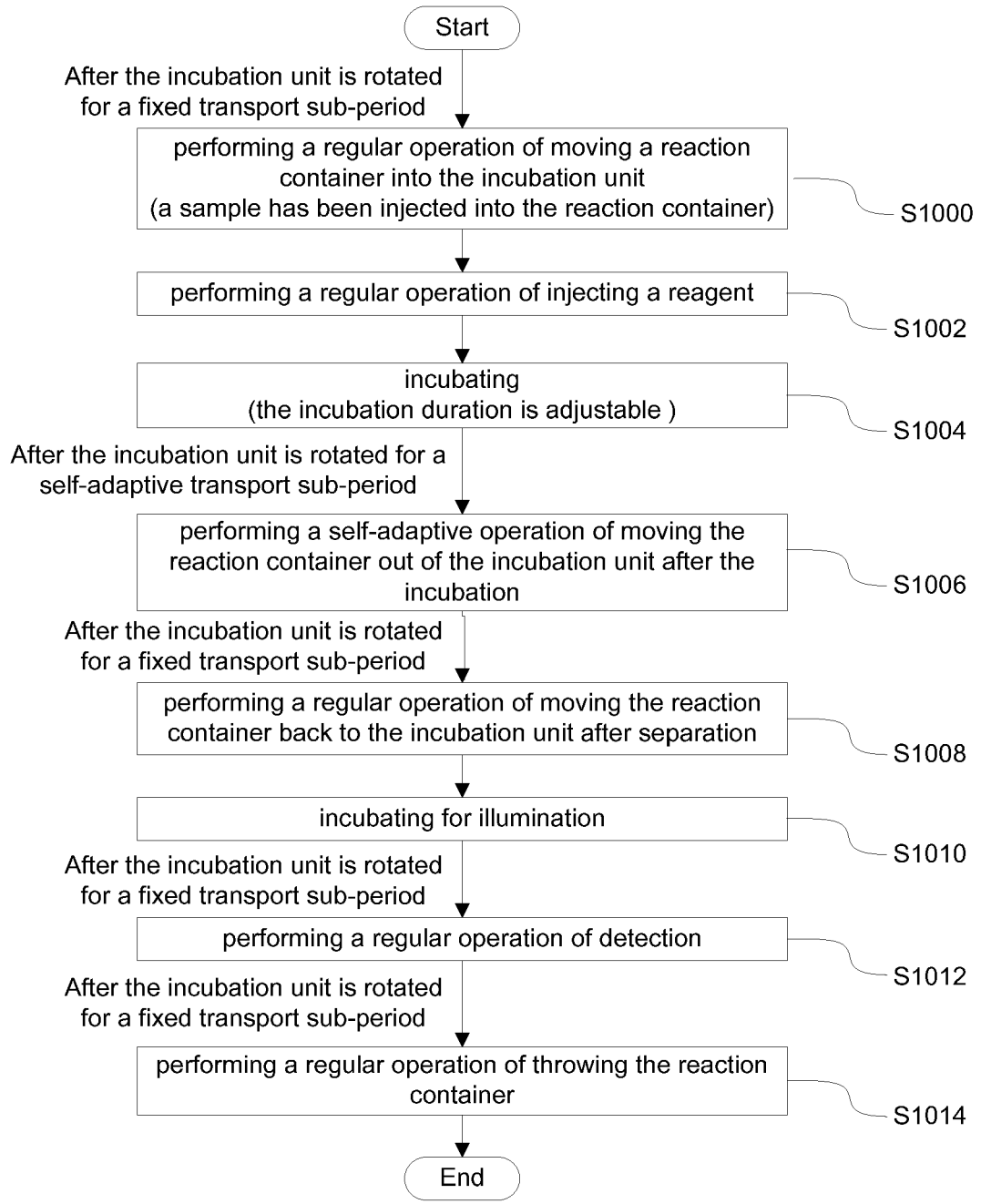
FIG. 12 is a flowchart of an embodiment of a component analysis method of one reaction container in accordance with a one-step test mode.

FIG. 12 illustrates a flowchart of a component analysis method for a reaction container in accordance with the one-step test mode, and also referring to FIGS. 5 and 9. When a test begins, the first delivering unit 142 delivers a new reaction container from the reaction container supply 130 to the sample supply depot 170. The sample injecting unit 144 injects a sample into the reaction container held in the sample supply depot 170. At the same time, the incubation unit 110 rotates in the fixed transport duration SC and an empty container holder on the incubation unit is moved to the delivering station 112. In step S1000, the first delivering unit 142 performs a regular move-in operation of moving a new reaction container into the incubation unit, which is also called an operation of adding a reaction container. In the stop duration ST of a fixed transport sub-period, a reaction container filled with a sample is moved into the incubation unit 110. The reagent injecting unit 145 is concurrently controlled to draw a reagent when the first delivering unit 142 performs the regular move-in operation. When the reaction container has been moved into the incubation unit 110, in step 1002, the reagent injecting unit is controlled to inject the reagent into the reaction container at the executing station 112 to realize the reagent injection. Thus, the first delivering unit 142 and the reagent injecting unit 145 concurrently perform the corresponding regular operations after the fixed rotation of the incubation unit and the performing efficiency of the executing stations is improved. In step 1004, the reaction container filled with the sample and the reagent starts to incubate on the incubation unit 110. The incubation time duration can be flexibly set according to the feature of each test item. When the incubation of the reaction container is finished, the incubation unit 110 rotates in a self-adaptive transport duration AC of a transport cycle corresponding to a self-adaptive move-out operation after incubation. The rotation distance, for which the incubation unit rotates in the self-adaptive transport duration to transport the incubated reaction container to the delivering station 113, is calculated according to the present position of the incubated reaction container and the position of the delivering station 113. In step 1006, the incubation unit 110 remains stationary in the stop duration AT of a self-adaptive transport sub-period, the second delivering unit 143 performs a self-adaptive move-out operation of moving the incubated reaction container out of the incubation unit 110 and delivering the incubated reaction container to the cleaning separator 160. In the next few transport cycles, unbounded components of the reaction solution in the incubated reaction container are removed by the cleaning separator 160. During the cleaning separation of the incubated reaction solution in the reaction container, the analysis system continues to control the incubation unit 110 to rotate according to the transport cycle. After the cleaning separation, the incubation unit 110 exactly rotates for a fixed transport sub-period SC of a certain transport cycle and an empty reaction container holder on the incubation unit is transported to the delivering station 113. In step 1008, the incubation unit 110 remains stationary in a stop duration ST, and the second delivering unit 143 performs a regular operation of moving the cleaned reaction container back into the incubation unit 110. In step 1010, the reaction container starts to incubate for illumination. The incubation unit 110 continues to rotate according to the transport cycle. After the incubation for illumination is finished, the incubation unit 110 rotates in a fixed transport duration SC to transport the reaction container to the detection station 111. In step 1012, the detection unit 141 performs a regular photometry operation to detect the analyte contained in the reaction container. Then the reaction container, which has been detected, is transported to the delivering station 112 by the incubation unit 110 in a fixed transport sub-period. In step 1014, the first delivering unit 142 performs a regular operation of throwing the reaction container. The testing process of the one-step test mode is then finished.

Figure 13:
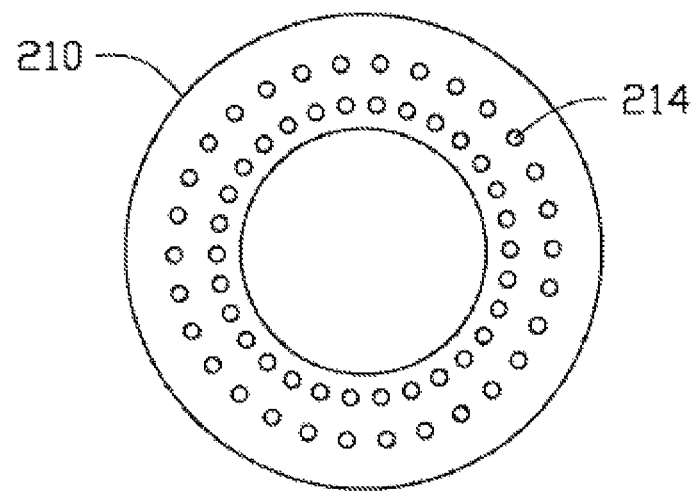
FIG. 13 is a diagrammatic view of the other embodiment of the incubation unit.
Figure 14:
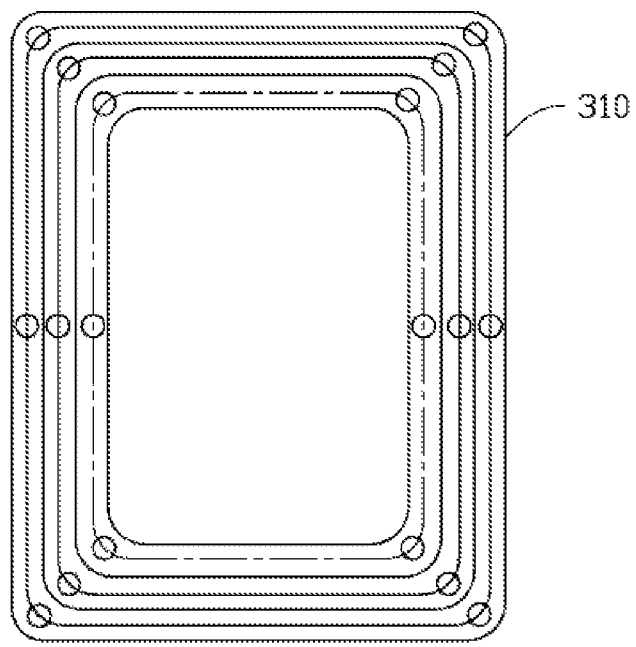
FIG. 14 is a diagrammatic view of another embodiment of the incubation unit.

The incubation unit includes at least one ring. In the other embodiments, the incubation unit includes two rings, as shown in FIG. 13. The incubation unit 210 can have a plurality of rings to receive more reaction containers and the reaction containers on different rings of the incubation unit can be concurrently operated with regular operations and be serially operated with self-adaptive operations, which not only makes the test more flexible, but also effectively increases the test flux of the automatic analysis device. In order to make the test more flexible, based on the present invention, each ring of the incubation unit can be independently driven and be flexibly controlled to rotate. For example, the incubation unit has three rings, among which an outer ring, a middle ring, and an inner ring are independently driven, so as to make the test more flexible and convenient. The incubation unit has a rotatable circular structure, such as a rotatable disc-shape illustrated in FIG. 13, a rotatable rail or other shapes according to another embodiment illustrated in FIG. 14. The other shapes, such as rails of the incubation unit 310, can improve the adaptability for different arrangements, expansibility and flexibility of automatic analysis. The functions and methods of these two embodiments are similar as above described.

Figure 15:
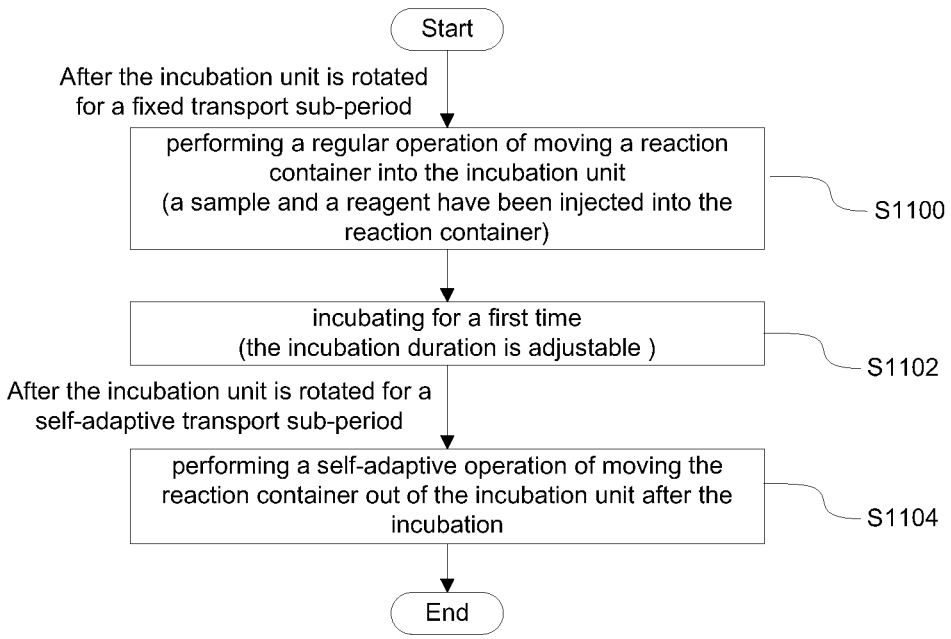
FIG. 15 is a flowchart of the other embodiment of a component analysis method of one reaction container in accordance with a one-step test mode.
Figure 16:
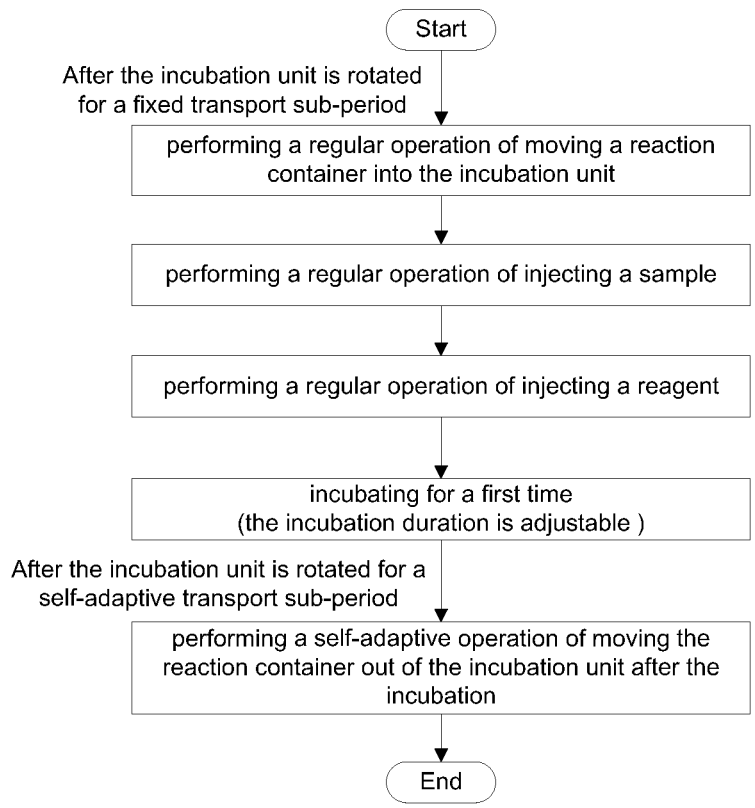
FIG. 16 is a flowchart of another embodiment of a component analysis method of one reaction container in accordance with a one-step test mode.

In the embodiments mentioned above, the sample injection is implemented outside the incubation unit. In other embodiments, the reagent injection can also be implemented outside the incubation unit. The sample injection and reagent injection can also be implemented in the incubation unit. These implementations can be flexibly designed and configured according to different requirements. In the embodiments described above, the detection of the analyzer is implemented in the incubation unit. In other embodiments, the detection can also be implemented in another unit, such as the cleaning separator. FIG. 15 illustrates a working process of the incubation unit according to another embodiment, in which the sample injection and reagent injections are implemented outside the incubation unit. After the incubation unit rotates in a fixed transport sub-period in step S1100, the first delivering unit performs a regular move-in operation of moving a reaction container filled with a sample and a reagent into the incubation unit. In step 1102, the reaction container starts to incubate in the incubation unit. The incubation time duration can be adjusted. After the incubation, the incubation unit rotates in a self-adaptive transport sub-period. In step S1104, the second delivering unit performs a self-adaptive move-out operation of move the reaction container out of the incubation unit. The detection is implemented in other units and the reaction container will not be moved back to the incubation unit again after cleaning separation. Thus, the operation of the incubation unit is simplified in this embodiment and the controlling of the incubation unit becomes easier. FIG. 16 illustrates a working process of the incubation unit according to another embodiment. The sample injection and reagent injection are implemented in the incubation unit. The delivering unit moves a new reaction container into the incubation unit. The detection is implemented in another unit. The operation of the incubation unit is simplified in this embodiment. Thus, in practical applications, these embodiments can be flexibly combined to satisfy the requirements of different designs.

The flowcharts of the component analysis method illustrated in FIGS. 12, 15, and 16 are different from each other, but are suitable for the same transport cycle. The difference therebetween involves different regular operations.

In each executing station, only one analysis operation or a number of different analysis operations can be performed, for example, in one executing station, a regular operation can be performed in a fixed transport sub-period, and a self-adaptive operation can be performed in a self-adaptive transport sub-period. For example, a move-in and move-out station can be provided, in which a regular operation of moving a reaction container into the incubation unit and a regular operation of moving a reaction container out of the incubation unit can be performed. An analysis operation to be performed in an executing station can be performed by an operation mechanism or several operation mechanisms, for example, in the injecting station, the sample injection and the reagent injection can be performed by a common aspirating needle or respectively by a sample injection needle and a reagent injection needle. Thus, the flexibility of auto analysis is improved. In practical applications, the number of executing stations, the analysis operations capable of being performed in each executing station, and the operation mechanisms set in each executing station can be flexibly designed according to a balance of the size of the automatic device, the cost of the manufacturing, and the test flux requirement.

In above embodiments, an agitating operation of agitating a sample with a reagent in a reaction container can be added as a regular operation or a self-adaptive operation after the sample injection and reagent injection.

Figure 3:
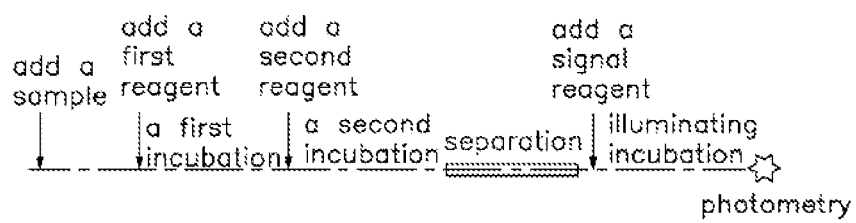
FIG. 3 is a schematic flowchart of two-step and one-separation test mode of a luminescence immunity analysis.

In another specific embodiment, if the two-step and one-separation test mode is employed, two reagent injecting operations are performed in a test process, as illustrated in FIG. 3. The test process includes a sample injecting operation, a first reagent injecting operation, a container-adding operation of moving a reaction container for a new analysis test into the incubation unit, a second reagent injecting operation after a first incubation, a move-out operation of moving a reaction container from the incubation unit to the cleaning separator after a second incubation, a move-in operation of moving a reaction container back to the incubation unit after the cleaning separation, and a photometry operation. Among these operations, because the performing time of the first incubation after the sample injection and the first reagent injection and the performing time of the second incubation after the second reagent injection are adapted to the requirements of test items, the second reagent injecting operation after the first incubation and the move-out operation after the second incubation are defined as self-adaptive operations, and the other operations are defined as regular operations.

Figure 4:
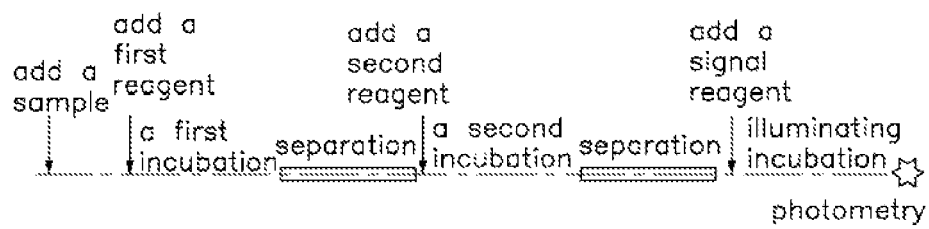
FIG. 4 is a schematic flowchart of two-step and two-separation test mode of a luminescence immunity analysis.

In another specific embodiment, if the two-step and two-separation test mode is employed, two reagent injecting operations and two separating operations are to be performed in a test process, as illustrated in FIG. 4. The test process includes a sample injecting operation, a first reagent injecting operation, an container-adding operation of moving a reaction container for a new analysis test into the incubation unit, a first move-out operation of moving a reaction container from the incubation unit to the cleaning separator after a first incubation, a first move-in operation of moving a reaction container back to the incubation unit after the cleaning separation, a second reagent injecting operation, a second move-out operation of moving a reaction container from the incubation unit to the cleaning separator after a second incubation, a second move-in operation of moving a reaction container back to the cleaning separator, and a photometry operation. Among these operations, because the performing time of the first incubation after the sample injection and the first reagent injection and the performing time of the second incubation after the second reagent injection are adapted to the requirements of test items, the first move-out operation after the first incubation and the second move-out operation after the second incubation are defined as self-adaptive operations, and the other operations are defined as regular operations.

Figure 17:
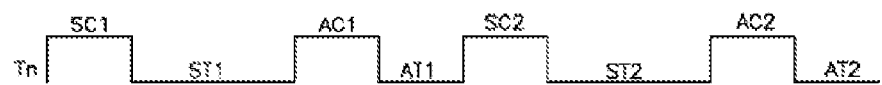
FIG. 17 is a sequence chart of an embodiment of a transport cycle of the incubation unit of FIG. 8 in accordance with two-step test mode.
Figure 18:
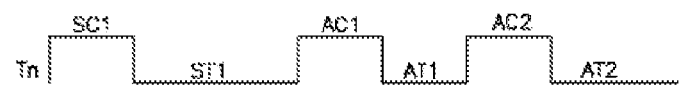
FIG. 18 is a sequence chart of the other embodiment of a transport cycle of the incubation unit of FIG. 8 in accordance with one-step test mode.

The test process of the two-step test mode includes two self-adaptive operations. Thus, in a preferable embodiment, the number of the self-adaptive transport sub-periods in one transport cycle is greater than or equal to two, namely one transport cycle includes at least one fixed transport sub-period and at least two self-adaptive transport sub-periods, referring to FIGS. 17 and 18. FIG. 18 schematically illustrates the Tn transport cycle. One transport cycle includes one fixed transport sub-period and two self-adaptive sub-periods, and the incubation unit rotates three times and stops twice in one transport cycle. The fixed transport sub-period includes a fixed transport duration and a fixed stop duration ST. The self-adaptive transport sub-periods respectively include a self-adaptive transport duration AC1, AC2 and a self-adaptive stop duration AT1, AT2. Two self-adaptive operations are respectively performed in the self-adaptive stop durations AT1, AT2.

The difference between the two-step and one-separation test mode and the one-step and one-separation test mode is that the two-step and one-separation test mode includes a second reagent injection. Thus, there are two self-adaptive incubation time durations and two self-adaptive operations in the two-steps and one-separation test mode. That is, a reaction container starts to incubate for the first time in the incubation unit after the sample injection and the first reagent injection. The first incubation time duration is flexibly set according to the features of each test item. The incubation unit rotates in a self-adaptive transportation period and transports the reaction container to the injecting station when the first incubation is finished, and the reagent injecting unit is controlled to perform a second reagent injecting operation. The reaction container starts to incubate in the incubation unit for the second time after the second reagent injection. The second incubation time duration can be flexibly set according to the features of each test item. The incubation unit rotates in a self-adaptive transportation period and transports the reaction container to the delivering station when the second incubation is finished, and a self-adaptive move-out operation after incubation is performed in the delivering station. The test process thereafter of the two-step and one-separation test mode is similar with that of the one-step and one-separation test mode.

The difference between the two-step and two-separation test mode and the one-step and one-separation test mode illustrated in FIG. 12 is that the two-step and two-separation test mode includes two reagent injections and two cleaning separations. Thus, there are two self-adaptive incubation time durations and two self-adaptive move-out operations after incubation. In detail, a reaction container starts to incubate for the first time in the incubation unit after the sample injection and the first reagent injection. The first incubation time duration is flexibly set according to the features of each test item. The incubation unit rotates in a self-adaptive transportation period and transports the reaction container to the delivering station after the first incubation. The second delivering unit performs a move-out self-adaptive operation of moving the reaction container from the incubation unit to the cleaning separator. The incubation unit rotates in a fixed transport sub-period and transports an empty reaction container holder to the delivering station after the cleaning separation. The second delivering unit performs a regular move-in operation of moving the reaction container back to the incubation unit. The incubation unit then rotates in a self-adaptive transport sub-period and transports the reaction container to the injecting station. The reagent injecting unit performs a self-adaptive second reagent injecting operation. The reaction container starts to incubate for the second time in the incubation unit after the second reagent injection. The second incubation time duration is flexibly set according to the features of each test item. The incubation unit rotates in a self-adaptive transport sub-period and transports the reaction container to the delivering station for performing a self-adaptive move-out operation after the second incubation. The test process thereafter of the two-step and two-separation test mode is similar with that of the one-step and one-separation test mode.

In addition to the analysis operations described above, the analysis method according the present application can also include other analysis operations, such as a pre-treatment operation, a sample pre-dilution operation, three-step test mode, and any combinations thereof.

As above, by increasing the number of the fixed transport sub-periods and the self-adaptive transport sub-periods in one transport cycle or transport period, more reaction containers can be concurrently operated with regular operations or serially operated with self-adaptive operations in one transport cycle or period. Thus, the flexibility and the efficiency of the analysis are greatly improved.

Second Embodiment

The difference between the first embodiment and the second embodiment is the determination of the first rotation distance. In this second embodiment, the first rotation distance is a fixed step increment M. That is, the incubation unit rotates for the fixed step increment M along a predetermined direction in each fixed transport sub-period. The first rotation distance M is given in a unit of a reaction container holder and is preferably smaller than the total number of the container holders in the incubation unit, and cannot be exactly divided by the total number N of the container holders. After a self-adaptive operation is performed in the stop duration of the present self-adaptive transport sub-period, the incubation unit is controlled to rotate and stop at the position where the incubation unit stops in the stop duration of the previous fixed transport sub-period, so that all the container holders can pass all executing stations in N transport cycles.

In the second embodiment above, the design of the fixed transport sub-period can ensure all the reaction container holders can be traversed in N transport cycles to be operated with regular operations, such as a regular move-in operation of moving a new reaction container, a regular photometry operation, and so on. The incubation unit rotates in a self-adaptive transport duration of a self-adaptive transport sub-period only when a certain condition is satisfied and can stop at any position after rotating for the self-adaptive transport duration, to perform a analysis operation required a variable rotation distance (that is the self-adaptive operation). Thus, the incubation time duration and the test flow can become flexible. The design of the fixed transport sub-period, which is the core of continuous testing, can make sure that tests are orderly performed. The design of the self-adaptive transport sub-period can make tests more flexible and diverse on the base of the design of the fixed transport sub-period. Combining the fixed transport sub-period and the self-adaptive transport sub-period can complete each other, so that both the test flux and the analysis performance are taken into account, and an automatic continuous flexible multi-mode analysis method is realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analysis method of an automatic analysis device, the automatic analysis device comprising an incubation unit having a plurality of container holders for holding a plurality of reaction containers and a plurality of executing stations around the incubation unit, the analysis method comprises:

controlling the rotation of the incubation unit periodically in accordance with a preset transport cycle, wherein each transport cycle comprises at least one fixed transport sub-period in which the incubation unit is rotated a first rotation distance in a first direction, and at least one self-adaptive transport sub-period in which the incubation unit is rotated a second rotation distance in the first direction or in a second direction opposite to the first direction, the first rotation distance of each fixed transport sub-period is determined at least by a reference position and a predetermined rotation interval, the reference position for a first transport cycle is defined as an initial position of the incubation unit the reference position for a second transport cycle is defined as a stop position where the incubation unit stops after the rotation of the incubation unit for the fixed transport sub-period of the first transport cycle, wherein the second rotation distance during each self-adaptive transport sub-period is determined by a position of one of the plurality of reaction containers requiring a self-adaptive operation and a position of one of the plurality of executing stations for performing the self-adaptive operation, wherein the second rotation distance is a variable based upon a flexible incubation time of a reaction solution;

performing at least one of the regular operations during a stop duration of the fixed transport sub-period at a first executing station, wherein the incubation unit is stopped after the incubation unit rotates the first rotation distance; and rotating the incubation unit to transport at least one reaction container requiring a self-adaptive operation to stop at a second executing station being configured to perform the self-adaptive operation in the at least one self-adaptive transport sub-period; and performing the self-adaptive operation at the second executing station during a stop duration of the at least one self-adaptive transport sub-period after the incubation unit rotates the second rotation distance each executing station comprising at least one operation mechanism being configured to perform a plurality of corresponding analysis operations on the plurality of reaction containers.

2. The method of claim 1, wherein the performing time of each regular operation is not dependent on a predetermined incubation time duration of a reaction container, and the performing time of each self-adaptive operation is dependent on a predetermined incubation time duration of a reaction container.

3. The method of claim 1, wherein controlling the rotation of the incubation unit periodically in accordance with a predetermined transport cycle comprises generating an operation time sheet being configured to determine which regular operation is performable in each fixed transport sub-period of each transport cycle and which self-adaptive operation is performable in each self-adaptive transport sub-period of each transport cycle, wherein the operation time sheet is generated according to samples to be tested and test items.

4. The method of claim 3, wherein before controlling the incubation unit to rotate in the fixed transport sub-period of the present transport cycle, the method further comprises:
calculating the first rotation distance of the fixed transport sub-period, wherein the first rotation distance of the fixed transport sub-period is a distance difference defined between the present position and the target position of the incubation unit along a rotation direction of the incubation unit, the target position is defined as a position after the rotation for the predetermined rotation interval from the initial position; and
finding out at least one of the regular operations to be performed in the fixed transport sub-period of the present transport cycle according to the operation time sheet,
wherein controlling the incubation unit to rotate in the fixed transport sub-period of the present transport cycle comprises controlling the incubation unit to stop after rotating for the first rotation distance and controlling the corresponding operation mechanism to perform the at least one of the regular operations after the incubation unit stops.

5. The method of claim 1, wherein the predetermined rotation interval is given in a unit of a container holder and is an integer less than a total number of the container holders set on the incubation unit, and the integer cannot be exactly divided by the total number of the container holders.

6. The method of claim 3, wherein before controlling the incubation unit to rotate in the self-adaptive transport sub-period of the present transport cycle, the method further comprises:
determining whether or not there is a self-adaptive operation to be performed in the self-adaptive transport sub-period of the present transport cycle according to the operation time sheet;
calculating the second rotation distance if there is a self-adaptive operation to be performed in the self-adaptive transport sub-period of the present transport cycle, wherein the second rotation distance is calculated as a distance difference between a present position of the reaction container to be operated with the determined self-adaptive operation and the position of the executing station for performing the determined self-adaptive operation, along the rotation direction of the incubation unit, wherein controlling the incubation unit to rotate in the self-adaptive transport sub-period of the present transport cycle comprises controlling the incubation unit to stop after rotating for the second rotation distance and controlling the corresponding operation mechanism to perform the determined self-adaptive operation when the incubation unit stops; and
controlling the incubation unit to remain stationary in the self-adaptive transport sub-period of the present transport cycle, if there is no self-adaptive operation to be performed in the self-adaptive transport sub-period of the present transport cycle.

7. The automatic analysis method of claim 1, wherein each transport cycle comprises two fixed transport sub-periods, the first rotation distances of these two fixed transport sub-periods are the same or are different.

8. An automatic analysis method of an automatic analysis device, the automatic analysis device comprising an incubation unit having a plurality of container holders for holding a plurality of reaction containers, the analysis method comprises:
controlling the rotation of the incubation unit periodically in accordance with a preset transport cycle, wherein each transport cycle comprises at least one fixed transport sub-period in which the incubation unit is rotated a first rotation distance in a first direction, and at least one self-adaptive transport sub-period in which the incubation unit is rotated a second rotation distance, wherein the first rotation distance is a predetermined constant distance difference, and the second rotation distance in the first direction or in a second direction opposite to the first direction is determined by a present position of one of the plurality of reaction containers requiring a self-adaptive operation and a position of an executing station for performing the self-adaptive operation, wherein the second rotation distance is a variable based upon a flexible incubation time of a reaction solution;
performing at least one of the regular operations during a stop duration of the fixed transport sub-period, wherein the incubation unit is stopped after rotating for the first rotation distance;
controlling the incubation unit to transport at least one reaction container requiring a self-adaptive operation to and stop at the executing station being configured to perform the self-adaptive operation in the self-adaptive transport sub-period and controlling an operation mechanism of the executing station to perform the self-adaptive operation; and
controlling the incubation unit to rotate and then stop at the position where the incubation unit stops in the fixed transport sub-period of the present transport cycle, after the self-adaptive operation is performed in the self-adaptive transport sub-period of the present transport cycle.

9. The method of claim 8, wherein the first rotation distance is given in a unit of a container holder and is an integer less than a total number of the container holders set on the incubation unit, and the integer cannot be exactly divided by the total number of the container holders.

10. An automatic analysis device for analyzing a target component in a sample, comprising:
an incubation unit which comprises a plurality of container holders for holding a plurality of reaction containers;
a plurality of executing stations set around the incubation unit, each executing station comprising at least one operation mechanism being configured to perform a plurality of corresponding analysis operations on the plurality of reaction containers, wherein the plurality of executing stations are respectively located at an intersection of a container holder and a movement track or a center line of the corresponding operation mechanism;
a control module being configured to:
control the rotation of the incubation unit periodically in accordance with a preset transport cycle, wherein each transport cycle comprises at least one fixed transport sub-period in which the incubation unit is rotated a first rotation distance in a first direction, and at least one self-adaptive transport sub-period in which the incubation unit is rotated a second rotation distance in the first direction or in a second direction opposite to the first direction, the first rotation distance of each fixed transport sub-period is determined at least by a reference position and a predetermined rotation interval, the reference position for a first transport cycle is defined as an initial position of the incubation unit, the reference position for a second transport cycle is defined as a stop position where the incubation unit stops after rotating for the fixed transport sub-period of the previous transport cycle, wherein the second rotation distance during each self-adaptive transport sub-period is determined by a present position of one of the plurality of reaction containers requiring a self-adaptive operation and a position of an executing station for performing the self-adaptive operation, wherein the second rotation distance is a variable based upon a flexible incubation time of a reaction solution;

control a corresponding operation mechanism to perform at least one of the regular operations during a stop duration of the fixed transport sub-period, wherein the incubation unit is stopped after rotating for the first rotation distance; and control the incubation unit to transport at least one reaction container requiring a self-adaptive operation to and stop at the executing station being configured to perform the self-adaptive operation in the self-adaptive transport sub-period and controlling an operation mechanism of the executing stations to perform the self-adaptive operation.

11. The automatic analysis device of claim 10, wherein the control module is further configured to:

generate an operation time sheet being configured to determine which regular operation is performable in each fixed transport sub-period of each transport cycle and which self-adaptive operation is performable in each self-adaptive transport sub-period of each transport cycle, wherein the operation time sheet is generated according to samples to be tested and test items.

12. The automatic analysis device of claim 11, wherein the control module is further configured to:

before controlling the incubation unit to rotate in the fixed transport sub-period of the present transport cycle, calculate the first rotation distance of the fixed transport sub-period, wherein the first rotation distance of the fixed transport sub-period is a distance difference defined between the present position and the target position of the incubation unit along a rotation direction of the incubation unit, the target position is defined as a position after the rotation for the predetermined rotation interval from the initial position; and find out at least one of the regular operations to be performed in the fixed transport sub-period of the present transport cycle according to the operation time sheet, wherein controlling the incubation unit to rotate in the fixed transport sub-period of the present transport cycle comprises controlling the incubation unit to stop after rotating for the first rotation distance and controlling the corresponding operation mechanism to perform the at least one of the regular operations after the incubation unit stops.

13. The automatic analysis device of claim 10, wherein the predetermined rotation interval is given in a unit of a container holder and is an integer less than a total number of the container holders set on the incubation unit, and the integer cannot be exactly divided by the total number of the container holders.

14. The automatic analysis device of claim 11, wherein the control module is further configured to:

before controlling the incubation unit to rotate in the self-adaptive transport sub-period of the present transport cycle, determine whether or not there is a self-adaptive operation to be performed in the self-adaptive transport sub-period of the present transport cycle according to the operation time sheet;

calculate the second rotation distance if there is a self-adaptive operation to be performed in the self-adaptive transport sub-period of the present transport cycle, wherein the second rotation distance is calculated as a distance difference between a present position of the reaction container to be operated with the determined self-adaptive operation and the position of the executing station for performing the determined self-adaptive operation, along the rotation direction of the incubation unit, wherein controlling the incubation unit to rotate in the self-adaptive transport sub-period of the present transport cycle comprises controlling the incubation unit to stop after rotating for the second rotation distance and controlling the corresponding operation mechanism to perform the determined self-adaptive operation when the incubation unit stops; and control the incubation unit to remain stationary in the self-adaptive transport sub-period of the present transport cycle, if there is no self-adaptive operation to be performed in the self-adaptive transport sub-period of the present transport cycle.

15. The automatic analysis device of claim 10, wherein the incubation unit comprises at least one ring, each ring comprises a plurality of container holders for holding reaction containers and is capable of being independently driven.

16. The automatic analysis device of claim 10, wherein the transport cycle comprises two fixed transport sub-periods, the first rotation distances of these two fixed transport sub-periods are the same or are different.

17. The automatic analysis device of claim 10, wherein the performing time of each regular operation is not dependent on a predetermined incubation time duration of a reaction container, and the performing time of each self-adaptive operation is dependent on a predetermined incubation time duration of a reaction container.

18. The automatic analysis device of claim 10, wherein the regular operations comprise a move-in operation of moving a reaction container into the incubation unit and a photometry operation of detecting a luminous intensity of the target component in the sample, and the self-adaptive operations comprise a move-out operation of moving a reaction container out of the incubation unit and a reagent injecting operation of adding a reagent a second time to the sample.

* * * * *